(12) United States Patent
Black et al.

(10) Patent No.: US 11,519,855 B2
(45) Date of Patent: Dec. 6, 2022

(54) CLOSE-COUPLED ANALYSER

(71) Applicant: EMERSON PROCESS MANAGEMENT LIMITED, Leicester (GB)

(72) Inventors: Paul Black, Stirling (GB); Ruth Lindley, Stirling (GB); Ian Howieson, Stirling (GB); Stephen Waldron, Stirling (GB)

(73) Assignee: EMERSON PROCESS MANAGEMENT LIMITED, Leicester (GB)

( * ) Notice: Subject to any disclaimer, the term of this patent is extended or adjusted under 35 U.S.C. 154(b) by 0 days.

(21) Appl. No.: 15/581,153

(22) Filed: Apr. 28, 2017

(65) Prior Publication Data

US 2018/0202926 A1    Jul. 19, 2018

(30) Foreign Application Priority Data

Jan. 19, 2017   (GB) ..................................... 1700905

(51) Int. Cl.
*G01N 21/39*      (2006.01)
*G01N 21/3504*    (2014.01)
(Continued)

(52) U.S. Cl.
CPC ......... *G01N 21/39* (2013.01); *G01N 21/3151* (2013.01); *G01N 21/3504* (2013.01);
(Continued)

(58) Field of Classification Search
CPC ................................................ G01N 21/3504
See application file for complete search history.

(56) References Cited

U.S. PATENT DOCUMENTS 2,844,730 A    7/1958  Tandler et al.
3,792,272 A    2/1974  Harte et al.
(Continued)

FOREIGN PATENT DOCUMENTS

CN    2243656    12/1996
CN    1768281    5/2006
(Continued)

OTHER PUBLICATIONS

Lackner et al. "Demonstration of methane spectroscopy using a vertical-cavity surface-emitting laser at 1.68 μm with up to 5 MHz repetition rate," Measurement Science and Technology, Jan. 2003, vol. 14, No. 1, pp. 101-106.
(Continued)

*Primary Examiner* — Rufus L Phillips
(74) *Attorney, Agent, or Firm* — Sheridan Ross P.C.

(57) ABSTRACT

A laser detection system comprises a sample chamber configured to receive and contain a volume of sample gas, one or more lasers within at least one laser housing, wherein each laser is configured to produce a respective laser beam for excitation of one or more different materials in the sample gas and the one or more lasers are outside the sample chamber, a detector apparatus for detecting light output from the sample chamber, a first optical interface to the sample chamber having at least one window that is at least partially transparent to the laser beams from the one or more lasers, wherein the at least one laser housing is positioned in a close-coupling arrangement relative to the at least one window of the first optical interface such that, in use, the laser beams are substantially unmodified by passage between the laser housing and the at least one window.

26 Claims, 5 Drawing Sheets

(51) Int. Cl.
  *G01N 21/31* (2006.01)
  *G01N 21/03* (2006.01)
(52) U.S. Cl.
  CPC ..... *G01N 21/031* (2013.01); *G01N 2021/399* (2013.01); *G01N 2201/0612* (2013.01); *G01N 2201/0633* (2013.01)

(56) References Cited

U.S. PATENT DOCUMENTS

| | | | |
|---|---|---|---|
| 3,851,213 | A | 11/1974 | Van Dam et al. |
| 4,496,839 | A | 1/1985 | Bernstein et al. |
| 4,598,201 | A | 7/1986 | Fertig et al. |
| 4,707,133 | A | 11/1987 | Roberts et al. |
| 4,927,265 | A | 5/1990 | Brownlee |
| 5,076,699 | A | 12/1991 | Ryan et al. |
| 5,202,570 | A | 4/1993 | Tanaka et al. |
| 5,373,160 | A | 12/1994 | Taylor |
| 5,407,638 | A | 4/1995 | Wang |
| 5,451,787 | A * | 9/1995 | Taylor ................ G01N 21/39 250/338.5 |
| 5,500,768 | A * | 3/1996 | Doggett ............. G01N 21/274 359/652 |
| 5,625,189 | A | 4/1997 | McCaul et al. |
| 5,751,419 | A | 5/1998 | Takahashi et al. |
| 5,760,895 | A | 6/1998 | Kebabian |
| 5,877,862 | A | 3/1999 | Nelson et al. |
| 5,896,088 | A | 4/1999 | Brooks, Jr. |
| 5,900,632 | A | 5/1999 | Sterling et al. |
| 5,923,035 | A | 7/1999 | Winkler et al. |
| 6,025,597 | A | 2/2000 | Sterling et al. |
| 6,184,535 | B1 | 2/2001 | Kashima et al. |
| 6,420,695 | B1 | 7/2002 | Grasdepot et al. |
| 6,545,278 | B1 | 4/2003 | Mother et al. |
| 6,560,545 | B2 | 5/2003 | Stedman et al. |
| 6,657,198 | B1 | 12/2003 | May |
| 6,723,989 | B1 | 4/2004 | DiDomenico et al. |
| 6,885,965 | B2 | 4/2005 | Butler et al. |
| 6,927,393 | B2 | 8/2005 | Cotte et al. |
| 6,983,639 | B1 | 1/2006 | DiDomenico et al. |
| 7,141,793 | B2 | 11/2006 | Johnson |
| 7,326,930 | B2 | 2/2008 | Crawely |
| 7,352,463 | B2 | 4/2008 | Bounaix |
| 7,483,192 | B2 | 1/2009 | Ulbricht et al. |
| 7,498,575 | B2 | 3/2009 | Huebner et al. |
| 7,590,156 | B1 | 9/2009 | Richardson et al. |
| 7,605,370 | B2 | 10/2009 | Russell |
| 7,679,047 | B2 | 3/2010 | Yoshida |
| 7,800,751 | B1 | 9/2010 | Silver et al. |
| 7,835,005 | B2 | 11/2010 | Appel et al. |
| 7,898,665 | B2 | 3/2011 | Brukilacchio et al. |
| 8,164,050 | B2 | 4/2012 | Ford et al. |
| 8,269,971 | B1 | 9/2012 | Marsh et al. |
| 8,686,364 | B1 | 4/2014 | Little et al. |
| 9,316,577 | B1 * | 4/2016 | Doggett ............. G01N 15/0205 |
| 2003/0071218 | A1 | 4/2003 | Nakamura et al. |
| 2003/0152307 | A1 * | 8/2003 | Drasek ..................... F23N 5/00 385/12 |
| 2003/0218750 | A1 * | 11/2003 | Friberg ..................... G01J 3/42 356/437 |
| 2006/0058682 | A1 | 3/2006 | Miller et al. |
| 2006/0268947 | A1 | 11/2006 | Kalayeh |
| 2007/0082407 | A1 | 4/2007 | Little |
| 2007/0098028 | A1 | 5/2007 | Alcock et al. |
| 2007/0230520 | A1 | 10/2007 | Mordaunt et al. |
| 2008/0135760 | A1 | 6/2008 | May |
| 2008/0198027 | A1 | 8/2008 | Bugge |
| 2008/0234670 | A1 | 9/2008 | Rogers et al. |
| 2008/0246955 | A1 | 10/2008 | Osaki et al. |
| 2010/0078563 | A1 | 4/2010 | Haveri et al. |
| 2010/0195096 | A1 | 8/2010 | Schlezinger |
| 2010/0228688 | A1 | 9/2010 | Little et al. |
| 2010/0230593 | A1 * | 9/2010 | Hill, Jr. .................. G01M 3/38 250/330 |
| 2010/0284017 | A1 | 11/2010 | Reyes et al. |
| 2011/0176068 | A1 | 7/2011 | Miller |
| 2011/0235045 | A1 | 9/2011 | Koerner et al. |
| 2011/0278472 | A1 | 11/2011 | Atzler |
| 2012/0037326 | A1 | 2/2012 | Ublacker |
| 2012/0182555 | A1 | 6/2012 | Statz et al. |
| 2013/0100451 | A1 | 4/2013 | Hager et al. |
| 2013/0148107 | A1 | 6/2013 | Tixier et al. |
| 2013/0319110 | A1 | 12/2013 | Otera |
| 2014/0077083 | A1 | 3/2014 | Birnkrant et al. |
| 2014/0160479 | A1 | 6/2014 | Hager et al. |
| 2014/0204382 | A1 | 7/2014 | Christensen |
| 2014/0291526 | A1 * | 10/2014 | Killich ............... G01N 21/8507 250/343 |
| 2015/0138533 | A1 | 5/2015 | Bolles et al. |
| 2015/0177131 | A1 | 6/2015 | Liu et al. |
| 2015/0241339 | A1 | 8/2015 | Maksyutenko et al. |
| 2015/0285679 | A1 | 10/2015 | Kasiutsich et al. |
| 2016/0069797 | A1 | 3/2016 | Chanda et al. |
| 2016/0084710 | A1 | 3/2016 | Keller et al. |
| 2016/0170218 | A1 | 6/2016 | Johnson et al. |
| 2017/0045450 | A1 | 2/2017 | Lieber et al. |
| 2017/0299503 | A1 | 10/2017 | Black et al. |
| 2017/0307519 | A1 | 10/2017 | Black et al. |

FOREIGN PATENT DOCUMENTS

| | | |
|---|---|---|
| CN | 101308090 | 11/2008 |
| CN | 101738382 | 6/2010 |
| CN | 102762975 | 10/2012 |
| CN | 103221793 | 7/2013 |
| CN | 103547910 | 1/2014 |
| CN | 103954560 | 7/2014 |
| CN | 104155241 | 11/2014 |
| CN | 204086105 | 1/2015 |
| CN | 104655279 | 5/2015 |
| CN | 204556499 | 8/2015 |
| CN | 104897613 | 9/2015 |
| CN | 104903700 | 9/2015 |
| CN | 104914058 | 9/2015 |
| CN | 105531580 | 4/2016 |
| DE | 19716061 | 3/1998 |
| DE | 102005032722 | 10/2006 |
| DE | 102007038943 | 2/2009 |
| EP | 768523 | 4/1997 |
| EP | 0768523 | 4/1997 |
| EP | 896216 | 2/1999 |
| EP | 0896216 | 2/1999 |
| EP | 0994340 | 4/2000 |
| EP | 994340 | 4/2000 |
| EP | 1193488 | 4/2002 |
| EP | 1605251 | 12/2005 |
| EP | 1734347 | 12/2006 |
| EP | 1783481 | 5/2007 |
| EP | 1836479 | 9/2007 |
| EP | 1972922 | 9/2008 |
| EP | 2375237 | 10/2011 |
| EP | 2607891 | 6/2013 |
| EP | 2927668 | 10/2015 |
| EP | 2344862 | 2/2016 |
| EP | 2993461 | 3/2016 |
| FR | 2735236 | 12/1996 |
| FR | 2971587 | 8/2012 |
| FR | 3009655 | 2/2015 |
| GB | 2389177 | 12/2003 |
| GB | 2391310 | 2/2004 |
| GB | 2401679 | 11/2004 |
| GB | 2493833 | 2/2013 |
| GB | 2497295 | 6/2013 |
| JP | 2000-510950 | 8/2000 |
| JP | 2003-215037 | 7/2003 |
| JP | 2005-522694 | 7/2005 |
| JP | 2008-281546 | 11/2008 |
| JP | 2011-191246 | 9/2011 |
| JP | 2013-205052 | 10/2013 |
| JP | 2015-505960 | 2/2015 |
| RU | 2372606 | 11/2009 |
| WO | WO 95/26497 | 10/1995 |
| WO | WO 97/43609 | 11/1997 |
| WO | WO 00/73768 | 12/2000 |

(56) References Cited

FOREIGN PATENT DOCUMENTS

| WO | WO 03/046522 | 6/2003 |
|---|---|---|
| WO | WO 2004/023114 | 3/2004 |
| WO | WO 2004/113169 | 12/2004 |
| WO | WO 2006/022550 | 3/2006 |
| WO | WO 2006/029920 | 3/2006 |
| WO | WO 2006/061681 | 6/2006 |
| WO | WO 2006/127722 | 11/2006 |
| WO | WO 2008/048994 | 4/2008 |
| WO | WO 2008/079032 | 7/2008 |
| WO | WO 2009/052157 | 4/2009 |
| WO | WO 2009/105571 | 8/2009 |
| WO | WO 2009/155459 | 12/2009 |
| WO | WO 2010/024756 | 3/2010 |
| WO | WO 2012/050696 | 4/2012 |
| WO | WO 2012/093952 | 7/2012 |
| WO | WO 2012/151358 | 11/2012 |
| WO | WO 2012/151678 | 11/2012 |
| WO | WO 2013/188914 | 12/2013 |
| WO | WO 2014/033465 | 3/2014 |
| WO | WO 2014/162536 | 10/2014 |
| WO | WO 2015/033582 | 3/2017 |

OTHER PUBLICATIONS

International Search Report and Written Opinion for International (PCT) Patent Application No. PCT/GB2018/050148, dated Apr. 6, 2018, 19 pages.
Official Action for U.S. Appl. No. 15/132,993, dated Jul. 10, 2019 20 pages.
Official Action for U.S. Appl. No. 15/132,993, dated Feb. 14, 2019, 17 pages.
Official Action for U.S. Appl. No. 15/132,993, dated Dec. 4, 2019 21 pages.
Search Report with English Translation for Russia Patent Application No. 2018139645, dated Jun. 22, 2020, 4 pages.
Notice of Allowance for U.S. Appl. No. 15/132,993, dated Mar. 18, 2020 11 pages.
Official Action with English Translation for China Patent Application No. 201610546747.6, dated Oct. 20, 2020, 21 pages.
Official Action with English Translation for China Patent Application No. 201610550320.3, dated Oct. 22, 2020, 18 pages.
Official Action with English Translation for Japan Patent Application No. 2018-553408, dated Jan. 26, 2021, 7 pages.
Official Action with English Summary for China Patent Application No. 201710294402.0, dated Oct. 19, 2021, 12 pages.
Official Action with English Translation for Japan Patent Application No. 2019-539237, dated Oct. 26, 2021, 14 pages.
International Search Report and Written Opinion for International (PCT) Patent Application No. PCT/GB2017/051068, dated Jun. 20, 2017, 14 pages.
International Search Report and Written Opinion for International (PCT) Patent Application No. PCT/GB2017/051078, dated Jul. 12, 2017, 16 pages.
Official Action for U.S. Appl. No. 15/132,993, dated Nov. 24, 2017 15 pages.
Official Action for U.S. Appl. No. 15/132,993, dated May 8, 2018 17 pages.
Official Action for U.S. Appl. No. 15/132,993, dated Sep. 28, 2018 16 pages.
Official Action for U.S. Appl. No. 15/133,517, dated Jun. 29, 2017 17 pages.
Official Action for U.S. Appl. No. 15/133,517, dated Feb. 9, 2018 16 pages.
Notice of Allowance for U.S. Appl. No. 15/133,517, dated Jun. 15, 2018 8 pages.
Notice of Allowance for U.S. Appl. No. 15/133,517, dated Sep. 6, 2018 8 pages.
Official Action for European Patent Application No. 17719683.9, dated Mar. 7, 2022, 10 pages.
Final Action with English Translation for Japan Patent Application No. 2019-539237, dated Jun. 7, 2022, 15 pages.

* cited by examiner

CLOSE-COUPLED ANALYSER

INTRODUCTION

The present invention relates to a laser detection system for detecting the presence or amounts of specified gases, for example a system for gas analysis based on laser absorption spectroscopy.

BACKGROUND

Measuring purity of a gas is essential for a manufacturer of gas. A purity measurement allows gas to be sold at a specified quality. Any gas produced that does not meet the quality requirements set by a manufacturer is likely to be wasted, for example flared. Therefore, to avoid waste, it is important that the purity measurement is reliable Continuous emission monitoring instruments are increasingly needed to monitor industrial pollution output in various industrial sites, for example at power plants, process industry factories and commercial shipping facilities. The need arises from efficiency improvements, health and safety considerations and legislative requirements. Legislative requirements often cover measurements on a range of multiple emitted compounds, for example: sulphur dioxide, nitrogen oxides, carbon monoxide, carbon dioxide, methane, water and oxygen.

Known gas analysis systems are sensitive to single compounds or a small number of compounds. To cover multiple compounds using known systems it may be necessary to install several different continuous emission monitoring instruments, which can be inefficient, complicated and take up significant amount of space.

Known gas analysis systems also include one or more optical cells, for example one or more Herriott cells, for containing a gas sample to be analysed and through which a laser beam passes in order to interact with the gas sample. Arrangement of optical cells and other optical components affects the geometry and size of a gas analysis system, and in order to make a system compact, for example to be able to contain the system within a compact, transportable housing, it can be important to provide a suitable arrangement of the optical cell and other optical components.

Known gas analysis systems may be at risk to potential cross-interference effects arising from atmospheric air. This is a problem when typical impurities being measured include compounds present in air, particularly when attempting to measure a quantity of these impurities below levels found in the atmosphere. Impurities that can be found in the atmosphere include, but are not limited to methane, water and carbon dioxide. Purge systems using dry nitrogen may be used to alter the atmosphere in the volume surrounding the gas detector. Alternatively, chemical scrubbing can also be used to address this problem, for example a carbon dioxide and/or oxygen scrubber. Both can be difficult to engineer and rely on the presence of utilities such as dry nitrogen or instrument air.

Other approaches also exist. These include using analysis software that takes into account cross-interference effects. However, backgrounds can be variable thus limiting this approach. In addition, if light from a laser experiences significant interference it may be degraded before reaching an optical cell and produce a weak and unreliable measurement.

SUMMARY

According to the present invention, there is provided a laser detection system comprising: a sample chamber configured to receive and contain a volume of sample gas; one or more lasers within at least one laser housing, wherein each laser is configured to produce a respective laser beam for excitation of one or more different materials in the sample gas and the one or more lasers are outside the sample chamber; a detector apparatus for detecting light output from the sample chamber; a first optical interface to the sample chamber having at least one window that is at least partially transparent to the laser beams from the one or more lasers, wherein the at least one laser housing is positioned in a close-coupling arrangement relative to the at least one window of the first optical interface such that, in use, the laser beams are substantially unmodified by passage between the laser housing and the at least one window.

The sample chamber may comprise an optical cell. The optical cell may be configured to perform the receiving and containing of the sample gas. The material(s) may comprise any suitable compound(s), for example any suitable gaseous compounds.

The close-coupling arrangement may be such that in operation the laser beams are substantially not absorbed by gas present between the laser housing and the at least one window. For example, the intensity of the laser beams may be reduced by less than 1% optionally less than 0.1% by passage between the laser housing and the at least one window. The separation between the laser housing and the at least one window may be less than 1%, optionally less than 0.1% of a path length of each laser beam within the housing.

The system may further comprise a second optical interface having at least one window to the sample chamber that is at least partially transparent to light output from the sample chamber, wherein the detector apparatus may be arranged to be in a close-coupling arrangement with the second interface such that, in use, the laser beams may be substantially unmodified by passage from an output of the sample chamber to the at least one window of the second optical interface.

The sample chamber may be sealed and/or the system may comprise means for controlling the pressure and/or gaseous content of the sample chamber.

Each laser housing may be sealed and/or may be under vacuum or may contain a selected gas and/or be at a selected pressure.

The detector apparatus may comprise a housing and at least one of: the detector apparatus housing may be sealed and/or may be under vacuum or may contain a selected gas and/or is at a selected pressure.

The close coupling arrangement(s) may be such that at least one of: there is a separation of less than 10 mm, optionally less than 5 mm, optionally less than 1 mm between at least one output aperture of the laser housing and the at least one window of the first optical interface; there is a separation of less than 10 mm, optionally less than 5 mm, optionally less than 1 mm between the at least one window of the second optical interface and the detector apparatus.

The at least one aperture of the at least one laser housing may comprise at least one window through which the laser beams pass in operation, and the at least one window of the at least one laser housing is in direct contact with the at least one window of the first optical interface. The at least one window of the second optical interface may be in direct contact with the detector apparatus.

The at least one laser housing may comprise an exit aperture through which the respective laser beam exits the laser, and in the close coupling arrangement, each of the laser exit apertures may be in direct contact with, or separated by less than 1 mm from, the window or a respective one of the windows of the first optical interface.

The detector apparatus may comprise a housing having an entry aperture for passage of the light output from the sample chamber and in the close coupling arrangement, the detector entry aperture may be in direct contact with, or separated by less than 1 mm from, the window or a respective one of the windows of the second optical interface.

The system may further comprise at least one coupling means configured to hold the at least one laser housing in the close coupling arrangement.

The at least one window of the first optical interface may comprise one or more flat or wedged optical windows, wherein each window may be associated with a respective at least one of the lasers.

The system may comprise at least one collimating lens associated with the window or at least one of the windows of the first optical interface.

The system may further comprise at least one directing device inside the sample chamber configured to direct laser beams passing through the one or more windows to an optical cell in the sample chamber, wherein the at least one directing device may be configured to direct the laser beams along a common optical path to the optical cell.

The at least one directing device inside the sample chamber may comprise a plurality of optical components arranged such that, for each laser beam a respective at least one of the optical components is arranged to direct said laser beam along the common optical path.

The plurality of optical components may be arranged substantially in a straight line. At least one of the optical components may comprise a flat or non-wedged optical component.

Each of the lasers and associated windows may be arranged such that in operation each of the lasers transmits its laser beam to its corresponding at least one of the optical components in a direction substantially orthogonal to said straight line.

The plurality of optical components may comprise at least one partially reflective mirror and/or at least one dichroic mirror.

The optical components may be arranged in series and may be configured such that in operation each optical component directs a laser beam from its associated laser to join said common optical path, and directs or allows passage of laser beam(s) from preceding optical components in the series along said common optical path.

Each of the optical components may be at least partially reflective and at least partially transmissive.

The at least one directing device may comprise steering optics between the last of said plurality of optical components and the optical cell and configured to direct the laser beams into the optical cell.

The detector apparatus may one or more detectors, each detector being configured to detect radiation of a respective wavelength or range of wavelengths.

The at least one window of the second optical interface may comprise one or more flat or non-wedged optical windows, wherein each window is associated with a respective one of the detectors.

The system may comprise further steering optics inside the sample chamber between the optical cell and the second optical interface and configured to direct light from the optical cell to the second optical interface.

Each of the windows and/or plurality of optical components may have a thickness in a range 0.1 mm to 1 mm.

The system may further comprise a controller configured to control operation of the one or more lasers such that the laser beams are pulsed laser beams interleaved in time.

The controller may be configured to synchronise operation of the detection apparatus and the lasers, thereby to obtain a series of detection signals, each detection signal being associated with a respective one of the lasers.

The controller may be configured to control operation of the lasers such that each laser beams is pulsed at a rate in a range 1 kHz to 200 kHz, optionally in a range 10 kHz to 100 kHz, and/or the controller may be configured to control the lasers such that each laser beams is pulsed with pulse lengths in a range 100 ns to 20,000 ns.

The sample gas may comprise at least one of ethylene, $H_2$, $N_2$, or natural gas.

The plurality of materials may comprise at least one of: $CO_2$, CO, $H_2O$, $CH_4$ and $NH_3$.

The plurality of materials may comprise at least one of: $H_2O$, MeOH, $NH_3$, $C_2H_2$, $O_2$, HF, HCl, $H_2S$, CO and $CO_2$.

Each of the plurality of lasers may be configured to produce infrared laser radiation.

Each of the lasers may be configured to produce a laser beam of a respective different wavelength or range of wavelengths and/or the or each detector apparatus is configured to detect radiation of a respective different wavelength or range of wavelengths.

At least one of the wavelengths or ranges of wavelengths may be selected from the following ranges: 4.21 to 4.24 µm; 4.56 to 4.59 µm or 4.72 to 4.76 µm; 6.09 to 6.14 µm; 7.43 to 7.47 µm; and 10.00 to 10.11 µm. The sample gas may comprise $H_2$ or $N_2$.

At least one of the wavelengths or ranges of wavelengths may be selected from the following ranges: 6.11 to 6.12 µm; 7.42 to 7.44 µm; 6.14 to 6.16 µm; 7.41 to 7.43 µm; 4.23 to 4.24 µm; and 4.73 to 4.74 µm. The sample gas may comprise ethylene.

At least one of the wavelengths or ranges of wavelengths may be selected from the following ranges: 2.47 to 2.48 µm; 1.74 to 1.75 µm; and 2.63 to 2.64 µm. The sample gas may comprise natural gas or a gas from a flue.

At least one of the wavelengths or ranges of wavelengths may be selected from the following range: 759 to 761 nm. The sample gas may comprise one of $H_2$ or $N_2$, ethylene, natural gas, or gas from a flue. The at least one material may comprise $O_2$.

The detector apparatus may be arranged on the opposite side of the optical cell to the one or more lasers and the at least one directing device.

The system may further comprise a gas supply arrangement configured to supply a sample gas to the sample chamber.

The optical cell may comprise a Herriott cell.

The optical cell may comprise an astigmatic Herriott cell.

The system may comprise a continuous emission monitoring system (CEMs) or an $H_2$ purity measurement system or an $N_2$ purity measurement or a natural gas purity measurement system or an ethylene purity measurement system. The CEMs may be configured to measure gas from a flue, for example a flue of a power plant, a process industry plant, or a shipping facility.

In a further aspect there is provided a laser for use in the laser detection system, the laser comprising at least one coupling means for coupling the laser in the close-coupling arrangement with the sample chamber.

In a further aspect there is provided a detector apparatus for use in the laser detection system, the detector apparatus comprising at least one coupling means for coupling the detector apparatus in the close-coupling arrangement with the sample chamber.

In a further aspect there is provided a sample chamber for use in the laser detection system, the sample chamber comprising at least one coupling means for coupling the sample chamber in a close coupling arrangement to at least one of the at least one laser and the detector apparatus.

In a further aspect, which may be provided independently, there is provided a method of detecting the presence, absence or amount of at least one material, optionally a plurality of materials, in a sample gas, comprising applying laser radiation to a sample gas that may contain the material(s), detecting radiation from the sample gas, and determining the presence, absence or amount of the plurality of materials based on the detected radiation.

The method may be performed using a system or apparatus according to any other aspect, and/or as claimed or described herein. The method may comprise using radiation of wavelengths or wavelength ranges as claimed or described herein.

Features in one aspect may be provided as features in any other aspect in any appropriate combination.

BRIEF DESCRIPTION OF THE DRAWINGS

Various aspects of the invention will now be described by way of example only, and with reference to the accompanying drawings, of which.

DETAILED DESCRIPTION

Figure 1:
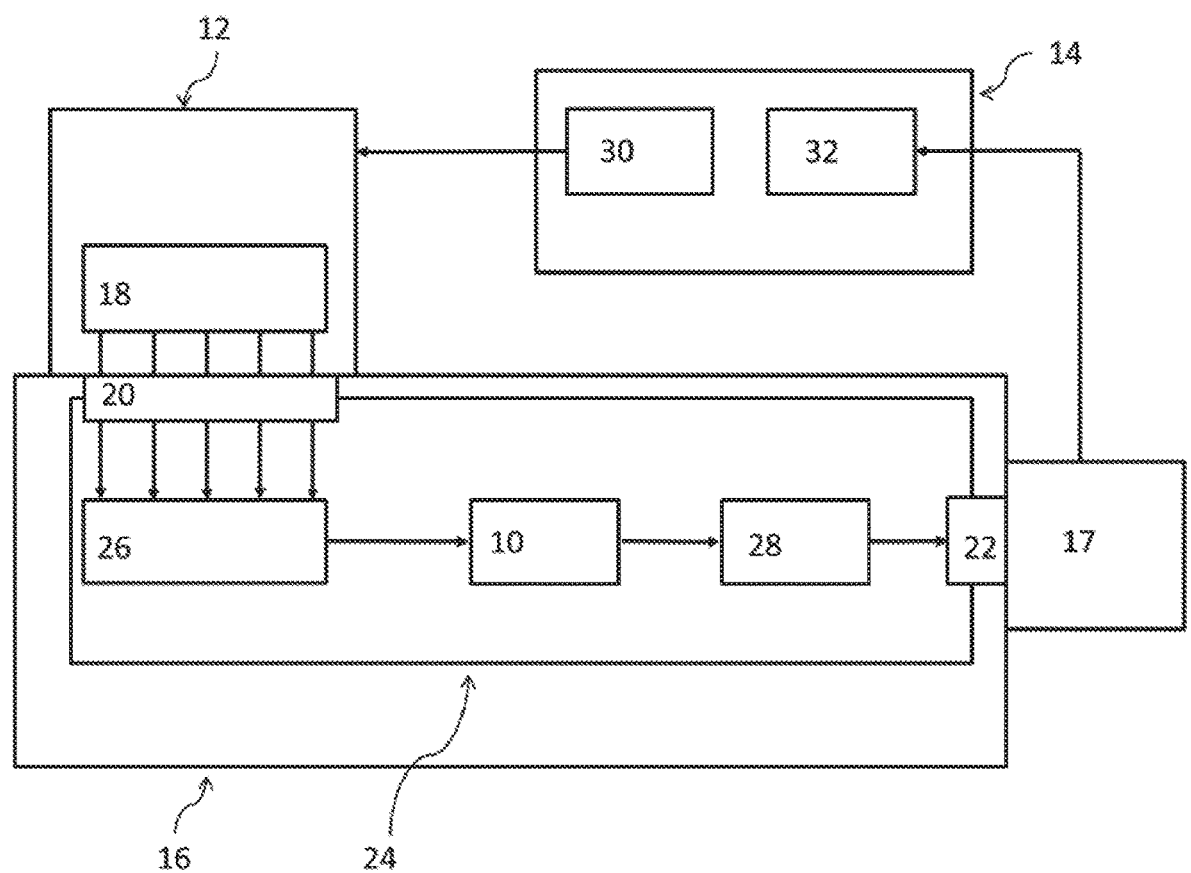
FIG. 1 is a schematic representation of a laser spectroscopy system.

FIG. 1 is a schematic representation of a laser spectroscopy system for analysing gas collected in an optical cell 10. The system comprises a laser apparatus 12, a controller 14, a sample apparatus 16 and a detector apparatus 17. The controller 14 is electronically, electrically or otherwise connected to the laser apparatus 12 and the sample apparatus 16. The laser apparatus 12 is optically coupled to the sample apparatus 16 and the sample apparatus 16 is optically coupled to the detector apparatus 17. The laser apparatus 12 comprises one or more lasers 18. Each of the one or more lasers 18 may be comprised in a laser module having a respective housing and aperture that may include a window through which the laser beam(s) pass in operation.

The sample apparatus 16 includes the optical cell 10. The sample apparatus 16 also includes a first optical interface 20, a second optical interface 22 and a sample chamber 24. The sample apparatus 16 also includes at least one directing device in the form of a plurality of optical components 26 arranged to direct laser beams from the one or more lasers 18 along a common optical path into the optical cell 10, as described in more detail below in relation to FIG. 3.

The optical cell 10 is contained inside the sample chamber 24. The at least one directing device and the steering components 28 are also contained inside the sample chamber 24. The sample chamber 24 is optically coupled to the laser apparatus 12 by the first optical interface 20. The sample chamber 24 is optically coupled to the detector apparatus 17 by the second optical interface 22.

The detector apparatus 17 comprises a plurality of detectors. The detectors are configured to detect light from the optical cell 10. The light may be infra-red or visible light or light of any other suitable wavelength or from any suitable part of the electromagnetic spectrum. The controller 14 comprises a control module 30 and a signal processor 32. The control module 30 is configured to control operation of the lasers 18 and the signal processor 32 is configured to process signals obtained from the detector apparatus 17. The controller 14 may be, for example, in the form of a suitably programmed PC or other computer, or may comprise dedicated circuitry or other hardware, for example one or more ASICs or FPGAs or any suitable mixture of hardware and software. The control module 30 and processing module may be provided as separate, distinct components in some embodiments, for example separate processing resources, rather than being provided within the same controller component as shown in FIG. 1.

The optical cell 10 has an optical entrance aperture and an optical exit aperture. The optical cell 10 may, for example, be a Herriott cell or any other suitable type of optical cell. The optical cell 10 is set inside the sample chamber 24. The sample chamber 24 of FIG. 1 defines a first enclosed volume into which a sample of gas can be introduced and collected. The optical cell 10 defines a second open volume smaller than the first enclosed volume and inside the first enclosed volume of the sample chamber 24. A sample of gas introduced and collected into the first enclosed volume is therefore introduced and collected into the second open volume defined by the optical cell 10.

The gas can comprise one or more different compounds or other materials of interest. An indication of the presence of these compounds in the gas collected in the optical cell 10 can be determined by passing light from the lasers 18 through the optical cell 10. If the light is in a wavelength range that corresponds to the absorption spectrum or absorption lines of the compound of interest, then any absorption of light as it passes through the cell may be due to the presence of the compound of interest in the sample. The level of absorption, once determined, can be used to determine a physical property of the compound of interest in the sample, for example, concentration. As different compounds have absorption spectra at different wavelength, different wavelengths of light are provided to the optical cell 10.

The one or more lasers 18 are directly coupled to the first optical interface 20 in a close-coupling arrangement. Likewise, the detectors of the detector apparatus 17 are directly coupled to the second optical interface 22 in a close-coupling arrangement. In some embodiments, the close-coupling arrangement may be such that the optical components are separated by a distance less than 1 mm. In some embodiments, in the close-coupled arrangement the optical components may be in contact, touching and/or butt-coupled.

Direct coupling of the lasers and detectors to the optical interface of the sample chamber offers the advantage that the optical path between laser and detector, traversed by a laser beam, is contained substantially, within the sample chamber. The path length of laser light outside the optical cell 10 is less than 2 mm preferably less than 1 mm. This is to be compared to typical prior art arrangements, where the path length outside the cell can be 50 to 70 cm. This has the effect that the laser beam is not exposed to atmospheric air outside the sample chamber and the compounds contained therein. In other words, the laser beam may be exposed to only the sample gas contained in the sample chamber.

Figure 2:
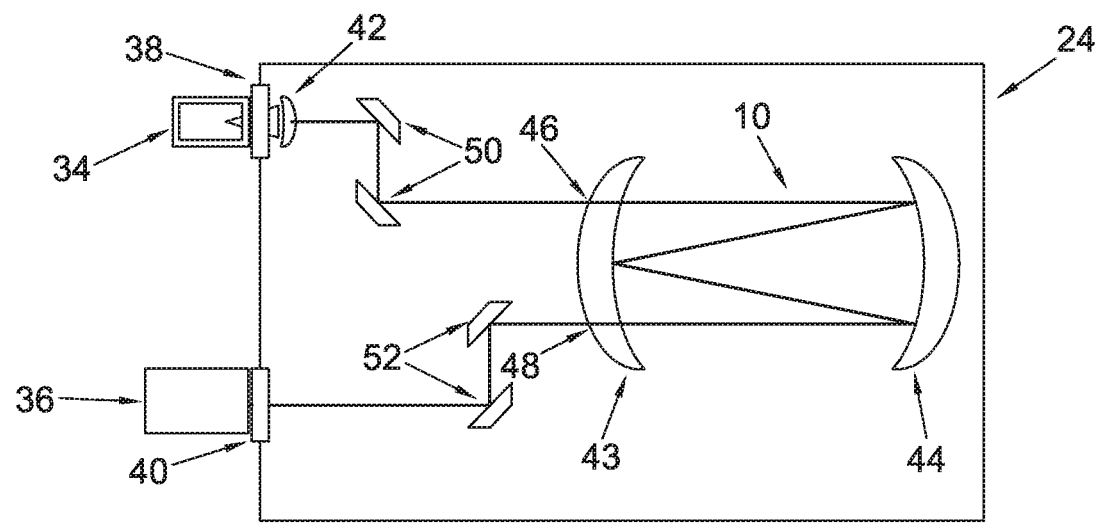
FIG. 2 is a schematic diagram of a sample chamber of the laser spectroscopy system.

FIG. 2 is a more detailed schematic view of the sample apparatus 16. FIG. 2 shows a representative laser 34 of the laser apparatus 12 having a housing and a representative detector 36 of the detector apparatus 17 having a housing. The housing of the laser 34 includes an aperture that has a window through which a laser beam from the laser passes in operation. FIG. 2 also shows the sample chamber 24. As discussed with reference to FIG. 1, the sample chamber 24 is coupled to the laser apparatus 16 via the first optical interface 20 and to the detector apparatus 17 via the second optical interface 22. The first optical interface 20 is represented by a first window 38 and a lens 42 in FIG. 2. The second optical interface 22 is represented by a second window 40. The first window 38 and the second window 40 are flat or non-wedge shaped windows. The lens 42 is a collimating lens and is positioned inside the sample chamber 24 at the first window 38.

In FIG. 2, the first window 38 and second window 40 are both positioned on the same face of the sample chamber 24. However, it is noted that FIG. 2 is a schematic diagram only and the positions of the first and second window may be different. In particular, if more than one laser or more than one detector are coupled to the sample chamber, or if a different optical cell type is used, then the layout of the sample apparatus 16 may be different.

FIG. 2 also shows the optical cell 10 inside the sample chamber 24 comprising a first reflecting element 43 and a second reflecting element 44. In particular, the optical cell 10 may be a Herriott cell comprising a first reflecting element 43 and a second reflecting element 44. The first reflecting element 43 is positioned closest to the first window 38. The first and second reflecting elements have an entrance aperture 46 and an exit aperture 48. In FIG. 2, the entrance and exit apertures are both positioned in the first reflecting element 43. Alternatively, the entrance aperture 46 may be positioned in the first reflecting element 43 and the exit aperture 48 may be positioned in the second reflecting element 44. Advantageously, this leads to a more compact system design.

FIG. 2 also shows a first set of optical steering components, inside the sample chamber 24, for directing light introduced into the sample chamber 24 via the window 38 and lens 42 to the entrance aperture 46 of the optical cell 10. The first set of optical steering components 50 includes a first and second steering mirror. The first and second steering mirrors are configured to act together to redirect, position and adjust the incident angle of a laser beam. FIG. 2 also shows a second set of optical steering components 52 for directing light from the exit aperture 48 to the second window 40. The second set of optical steering components 52 includes a third and fourth steering mirror. The third and fourth steering mirrors are configured to act together to redirect, position and adjust the incident angle of a laser beam.

Figure 3:
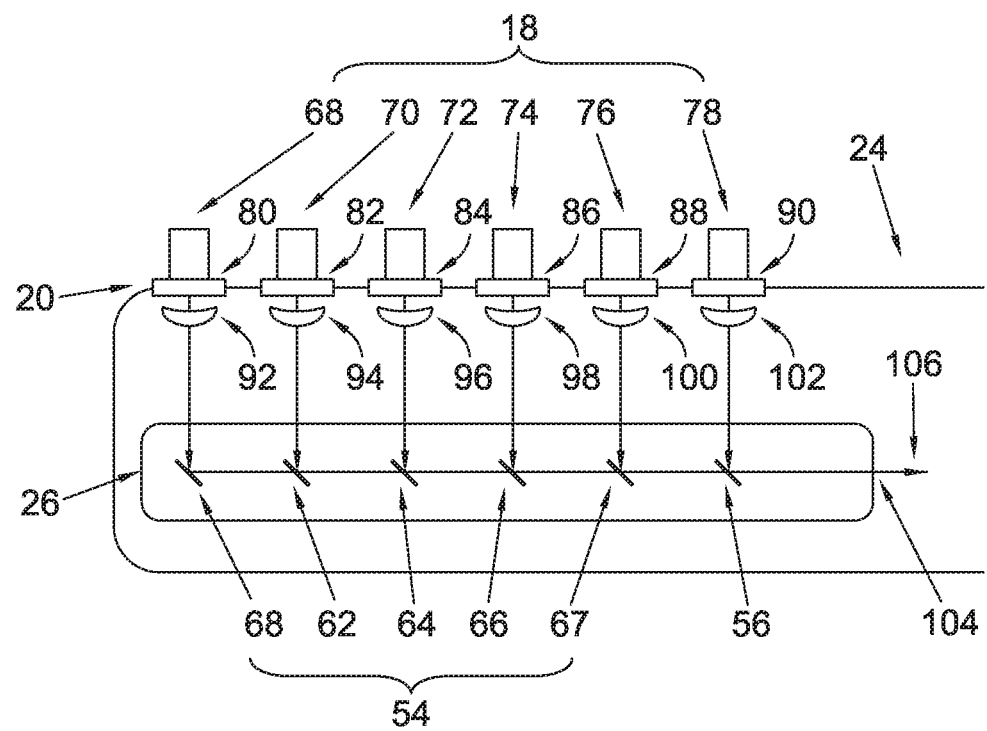
FIG. 3 is a schematic view of a laser apparatus of the laser spectroscopy system.

FIG. 3 is a more detailed schematic view of a part of the laser apparatus 12 of the laser spectroscopy system shown in FIG. 1. FIG. 3 shows how a plurality of lasers is incorporated into the laser spectroscopy system. FIG. 3 show the lasers 18, the sample chamber 24, the first optical interface 20 and the optical components 26 of FIG. 1 in more detail.

The optical components 26 comprise a set of partially reflective mirrors 54 and a dichroic mirror 56. The dichroic mirror is included as this embodiment may be used in relation to the measurement of $O_2$. In other embodiments no dichroic mirror is used, as discussed further below. The partially reflective mirrors 54 comprise a first mirror 60, a second mirror 62, a third mirror 64, a fourth mirror 66 and a fifth mirror 67. The lasers 18 comprise a first laser 68, a second laser 70, a third laser 72, a fourth laser 74, a fifth laser 76 and a sixth laser 78. The first optical interface 20 comprises a first window 80, a second window 82, a third window 84, a fourth window 86, a fifth window 88 and a sixth window 90. The first optical interface 20 also comprise a first lens 92 associated with the first window 80, a second lens 94 associated with the second window 82, a third lens 96 associated with the third window 84, a fourth lens 98 associated with the fourth window 86, a fifth lens 100 associated with the fifth window 88 and a sixth lens 102 associated with the sixth window 90. Each of the lasers 68, 70, 72, 74, 76 and 78 has a corresponding window 80, 82, 84, 86, 88 and 90. Each of the lasers 18 is directly coupled to their corresponding window. Light from each of the lasers is input into the sample chamber 24 via their corresponding window and lens.

The partially reflective mirrors 54 and the dichroic mirror 56 are configured to direct laser beams from the lasers 18 along a common optical path to point 104. The additional steering optical components to steer a combined laser beam 106 from point 104 along the common optical path to the optical cell 10 are included in the system but not shown in FIG. 3. The additional steering optical components are shown schematically in FIG. 2. Each of the lasers 68, 70, 72, 74, 76 and 78 has a corresponding mirror 60, 62, 64, 66, 67 and 56. The partially reflective mirrors 54 and the dichroic mirror 56 are arranged in a straight line. Each mirror is tilted with respect to this straight line at a 45 degree angle. The straight line defines a direction of propagation from the first mirror 58 to the dichroic mirror 56 and then to point 104. The combined laser beam 106 propagates along the direction of propagation.

Any suitable partially reflective mirrors may be used. In the embodiment of FIG. 3, each of the partially reflective mirrors comprise coated infrared $BaF_2$ or $CaF_2$ windows that have an optical coating applied to control broadband reflection of the front surface. Any other suitable materials can be used in alternative embodiments. In the embodiment of FIG. 3, two coatings are used, an 80:20 (80% transmission, 20% reflection) and a 50:50 (50% transmission, 50% reflection). This can allow the variety of laser powers to be adjusted to harmonise the output power to a consistent value for each laser (within practical limits). More or fewer coatings can be used in alternative embodiments. The coatings of the partially reflective mirrors of FIG. 3 are designed to be broadband, such that any variation in their response to a change in wavelength, particularly around wavelengths of interest, is reduced or minimised.

Any suitable dichroic mirror may be used. In the embodiment of FIG. 3, the dichroic mirrors comprises a coated infrared $BaF_2$ window that has an optical coating applied to cause light lower than a specified wavelength to be reflected and light higher than said specified wavelength to be transmitted. Any other suitable materials can be used in alternative embodiments. In the embodiment of FIG. 3, the coating is such as to reflect light less than 1 μm in wavelength and to transmit light greater than 1 μm in wavelength.

Any suitable windows may be used. In the embodiment of FIG. 3, each of the windows comprise coated infrared $BaF_2$ or $CaF_2$ windows In other embodiments, other suitable types of mirror or optical devices may be used in place of the partially reflective mirrors and the dichroic mirror. For example, in some embodiments a mirror other than a dichroic mirror or partially reflective mirror may be used at the position of the dichroic mirror 56, e.g. at the last mirror position before point 104. Such a mirror may be used at the last position to introduce more power into the cell. This can be possible as or if the last position does not have any additional lasers behind it such that no lasers need to pass through the last position. In alternative embodiments, any suitable number and combination of partially reflective mirrors and dichroic mirrors may be used.

Each of the partially reflective mirrors 54 is configured to partially reflect and partially transmit light incident on it. The reflection and transmission properties of the mirror are chosen to direct laser beams from the lasers 18 along the common optical path. In the embodiment of FIG. 3, each of the partially reflective mirrors 54 reflects 20% of the incident light and transmits 80% of the incident light from the corresponding one of the lasers 18. The partially reflective mirrors 54 may have different reflection and transmission properties in alternative embodiments. The dichroic mirror 56 is defined by a reflection wavelength range and is configured to reflect light that has a wavelength in the reflection wavelength range and transmit light with a wavelength outside the reflection wavelength range. The reflection wavelength range of the dichroic mirror 56 is chosen to correspond to a wavelength range of the sixth laser 78, such that light from the sixth laser 78 is reflected and light from the first to fifth lasers is transmitted. The mirrors are flat or non-wedged optical components. Advantageously this allows the system to operate in an orthogonal fashion. For example, the system has a geometrical arrangement such that the direction of propagation from the first mirror 60 to the dichroic mirror 56 is substantially orthogonal to the laser beams output from the lasers 18.

Another advantage of using flat or non-wedged optical components in embodiments is that the directing of the laser beams to the common optical path may be substantially independent of wavelength, for example such that any distortion effects or other artefacts caused by the optical components may be substantially independent of wavelength. However, the use of partially reflective mirrors may cause the resulting optical signal to be subject to fringe interference effects. These effects can be reduced by selecting the dimensions, in particular the thickness, of the optical components to control the Free Spectral Range of the system. The Free Spectral Range is a measure of the wavelength difference between two successive maxima or minima. The Free Spectral Range may be represented by $FSR=1/(2 \times n \times L)$ where L is thickness of the glass and n is the refractive index. Typically, a suitable thickness of the optical components is less than 1 mm. This choice presents, for certain choices of materials such as $BaF_2$ for example, at worse a Free Spectral Range of 4 $cm^{-1}$ or greater. By controlling the Free Spectral Range, the frequency at which fringing effects occur can be shifted to not coincide and/or interfere with the measurement of the compounds in the optical cell 10.

The Free Spectral Range of this magnitude provides a spectral window that is similar in width to the spectral window covered by an entire laser scan. An expected effect is a curvature on the background of the laser pulse. This background can be easily removed using spectral fitting algorithms as part of the processing the signal. Additional fringing effects are avoided in the steering optical components 28 in the sample apparatus 16 and optics used to steer light to the optical cell 10 through the use of non-flat or wedged optical components.

Each laser in FIG. 3 has a corresponding mirror belonging to the set of five partially reflective mirrors 54 and a dichroic mirror 56. In operation a laser beam from the first laser 68 passes through the first window 80 and first lens 92 into the sample chamber 24. The laser beam continues to the first mirror 60 and then from the first mirror 60 to the point 104. The first mirror 60 is tilted such that the laser beam from the first laser 68 is reflected at a right angle by the first mirror 58. Likewise, each of the second to fifth lasers has a corresponding optical path defined by the second to fifth windows, lenses and mirrors. A sixth optical path is defined in the same way from the sixth laser 78 to the dichroic mirror 56 and to the point 104. All of the mirrors are arranged at the same tilted angle as the first mirror 60 such that each of the optical paths bends at a right angle at its point of intersection with its corresponding mirror.

The mirrors are arranged such that laser beams from the lasers 68, 70, 72, 74, 76 and 78 pass along a common optical path to the cell 10 via point 104 after passing through their corresponding window 80, 82, 84, 86, 88 and 90, being focussed by their corresponding lens 92, 94, 96, 98, 100 and 102 and being reflected by their corresponding optical components 60, 62, 64, 66, 67 and 58. The common optical path may, for example, have one end at the first mirror 60 and the other end at the entrance aperture to the optical cell 10 and may extend through point 104 and when directed to pass along the common optical path, the optical paths of each respective laser joins the common optical path. Hence, the optical paths of each laser may substantially overlap.

The laser modules can be swapped for other laser modules. Therefore, FIG. 3 and the corresponding description above is an illustrative example of one choice of configuration of laser modules. In some embodiments the laser spectroscopy system can host up to six laser modules. The configuration of FIG. 3 includes the sixth laser 78 with a sub-range that is suitable to detect $O_2$. The dichroic mirror 56 corresponding to the sixth laser 78 is also included in the system. As discussed later, if the system is configured to detect a set of components that does not include $O_2$ the sixth laser 78 is replaced by a laser in a suitable wavelength range and the dichroic mirror 56 is replaced by a sixth partially reflective mirror.

Figure 4:
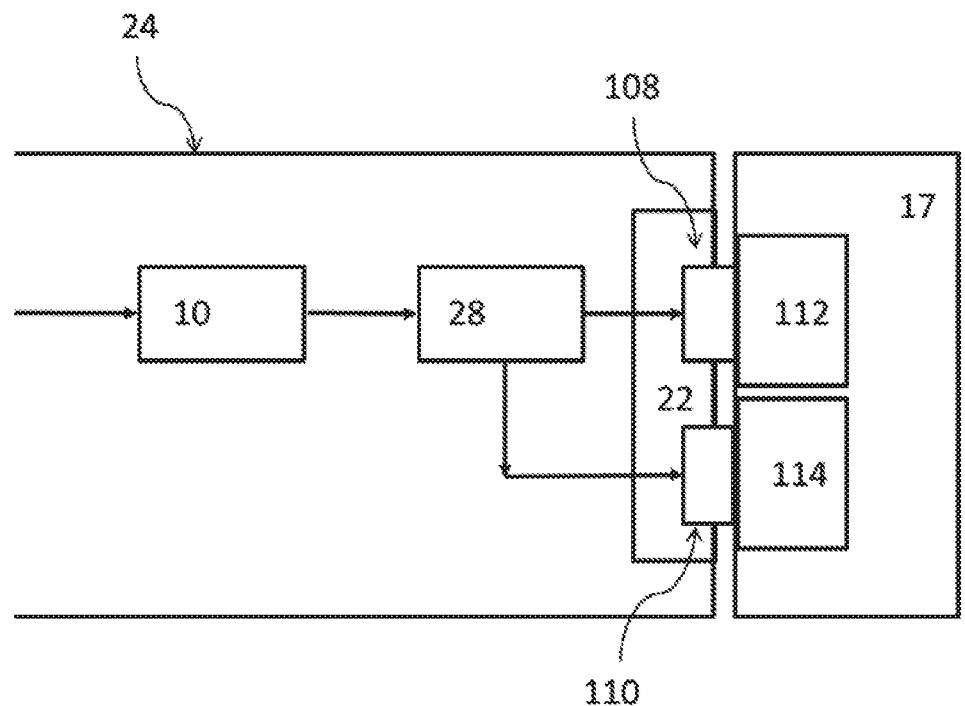
FIG. 4 is a schematic representation of a detector apparatus of the laser spectroscopy system.

FIG. 4 is a more detailed schematic view of the detection part of the laser spectroscopy system shown in FIG. 1. FIG. 4 shows how a plurality of detectors is incorporated into the laser spectroscopy system. FIG. 4 show the optical cell 10, the optical steering components 28, the sample chamber 24, the second optical interface 22 and the detector apparatus 17, which includes an outer housing, of FIG. 1 in more detail.

FIG. 4 shows the second interface 22 comprising a first output window 108 and a second output window 110. The detector apparatus 17 has a first detector 112 and a second detector 114. The steering optical components 28 in the sample chamber 24 are configured to steer light from the optical cell 10 to a first detector 112 of the detector apparatus 112 or to a second detector 114 of the detector apparatus 17. The first detector 112 is directly coupled to the first output window 108. The second detector 114 is directly coupled to the second output window 110. The first detector 112 is sensitive to light from one or more lasers in a first subset of lasers of the laser apparatus 12. The second detector 114 is sensitive to light from one or more lasers in a second subset of lasers of the laser apparatus 12. For the configuration described with respect to FIG. 3, with the dichroic mirror, the first detector is sensitive to light from the first to fifth lasers and the second detector is sensitive to light from the sixth laser.

Table 1 provides, in further detail, possible configurations of laser modules in the spectroscopy system and corresponding detectors that can be implemented in the system. Careful selection of wavelength ranges of the lasers allows multiple measurements per laser wavelength. The first column of Table 1 shows the compound that is to be detected. The second and third column shows one or more wavelength ranges suitable for detection of the compound. The third column of Table 3 shows the detector type. In the final column, a typical but non-limiting application of the choice of wavelength range is shown.

TABLE 1

| Gas | Wavelength Range/um | Wavenumber Range/cm−1 | Detector Type | Typical application |
|---|---|---|---|---|
| H$_2$O | 6.11-6.12 | 1635-1636 | A | Ethylene |
|  | 6.09-6.14 | 1630-1640 | A | H$_2$/N$_2$ |
|  | 5.518-5.530 | 1809-1812 | A | Natural gas |
| MeOH | 7.42-7.44 | 1345-1346 | A | Ethylene |
| NH$_3$ | 6.14-6.16 | 1626-1627 | A | Ethylene |
|  | 10.00-10.11 | 990-1000 | A | H$_2$/N$_2$ |
| C$_2$H$_2$ | 7.41-7.43 | 1347-1348 | A | Ethylene |
| CO$_2$ | 4.23-4.24 | 2362-2364 | A | Ethylene |
|  | 4.21-4.24 | 2360-2370 | A | H$_2$/N$_2$ |
|  | 4.854-4.878 | 2050-2060 | A | Natural gas |
| CO | 4.73-4.74 | 2111-2112 | A | Ethylene |
|  | 4.56-4.59 | 2180-2190 | A | H$_2$/N$_2$ |
|  | 4.72-4.76 | 2105-2115 | A | H$_2$/N$_2$ |
| CH$_4$ | 7.43-7.47 | 1340-1345 | A | H$_2$/N$_2$ |
| HF | 2.47-2.48 | 4038-4040 | B | CEMs |
| H$_2$S | 2.63-2.64 | 3792-3794 | B | Natural gas |
| HCl | 1.74-1.75 | 5738-5740 | B | CEMs |
| O$_2$ | 759-761 nm | 13150-13160 | C | All |

As can be seen from Table 1, three detectors A, B and C are listed. Each of the detectors A, B and C is sensitive to light from a different wavelength or wavelength ranges. Due to compatibility of physical housing of the system and the detectors, as described with reference to FIG. 5, certain combinations of detectors can be included in the system. Options include: (i) only detector A; (ii) only detector B; (iii) only detector C; (iv) detector A and detector B; and (v) detector A and detector C. As described elsewhere, if detector C is included (options (iii) and (v)) for detecting O$_2$, the dichroic mirror 56 must be included. For options (i), (ii) and (iv), no dichroic mirror is included and all mirrors are partially reflective mirrors. In alternative embodiments, any suitable combination of detectors may be provided in order to detect any of the listed materials of interest using one or more of the listed wavelengths or wavelength ranges.

The operation of the system is now described with reference to FIG. 1, FIGS. 3 and 4. In operation, the lasers 18 are controlled by the control module 30, or other control component in other embodiments, to sequentially produce pulses. The sequence may be as follows. The first laser 68 produces a first pulse that is directed to point 104 by the optical components and passes onward to the optical cell 10. Subsequently, the second laser 70 produces a second pulse that is directed to point 104 by the optical components and passes onward to the optical cell 10. This is followed, in turn, by a third pulse produced by the third laser 72 that is directed to point 104 by the optical components and passes onward to the optical cell 10, a fourth pulse produced by the fourth laser 74 that is directed to point 104 by the optical components and passes onward to the optical cell 10, a fifth pulse produced by the fifth laser 76 that is directed to point 104 by the optical components and passes onward to the optical cell 10, and a sixth pulse produced by the sixth laser 78 that is directed to point 104 by the optical components and passes onward to the optical cell 10. Following the sixth pulse, this sequence is repeated. The pulsed beams from each of the lasers are interleaved and/or non-overlapping in time and propagate along the common path to the optical cell 10

Following the above sequence, the first pulse is incident on, and passes through, the first window 80 and the first lens 92 and is then incident on, and reflected by, the first mirror 60 and is then transmitted by the second, third, fourth, fifth mirrors and the dichroic mirror to point 104 and continues to the optical cell 10 and the detector apparatus 17. Subsequently, the second pulse is incident on, and passes through, the second window 82 and the second lens 94 and is then incident on and reflected by, the second mirror 62 and is then transmitted by the third, fourth and fifth mirrors and the dichroic mirror to point 104 and onward to the optical cell 10 and detector apparatus 17. Subsequently, the third pulse is incident on, and passes through, the third window 84 and the third lens 96 and is then incident on, and reflected by, the third mirror 64 and then transmitted by the fourth and fifth mirrors and the dichroic mirror to point 104 and onward to the optical cell 10 and detector apparatus 17. Subsequently, the fourth pulse is incident on, and passes through, the fourth window 86 and the fourth lens 98 and is then incident on, and reflected by, the fourth mirror and is then transmitted by the fifth mirror and the dichroic mirror 56 to point 104 and onward to the optical cell 10 and detector apparatus 17. Subsequently, the fifth pulse is incident on, and passes through, the fifth window 88 and the fifth lens 100 and is then incident on, and reflected by, the fifth mirror 67 and is then transmitted by the dichroic mirror 56 to point 104 and onward to the optical cell 10 and detector apparatus 17. The last pulse in the sequence is the sixth pulse and this pulse is incident on, and passes through, the sixth window 102 and the sixth lens 102 and is then incident on, and reflected by, the dichroic mirror 56 to point 104 and onward to the optical cell 10 and detector apparatus 17. The pulse sequence is then repeated.

The pulses propagate through the optical cell 10 towards the second optical interface 22. The pulses pass through the second optical interface 22 to the detector apparatus 17. The steering optical components 28 in the sample apparatus 16 steer light (originating from the first to fifth lasers) from the optical cell 10 to the first detector 112 via the first output window 108. The first detector is sensitive to light from the first to fifth lasers. Thus, in this embodiment one of the detectors is sensitive to light from more than one of the lasers. The steering optical components 28 in the sample chamber 24 steer light (originating from the sixth laser) from the cell to the second detector 114 via the second output window 110. The second detector is sensitive to light from the sixth laser 78. The steering optical components 28 include a second dichroic mirror to direct light of the sixth laser 78 towards the second detector 114 and to direct light of the first to fifth lasers to the first detector 112. The optical properties of the second dichroic mirror may match the properties of the dichroic mirror 56. The steering optical components 28 include two separate off-axis parabolic mirrors to focus the two different branches of light onto the two detectors. The control module 14 synchronises operation of the lasers and the first and second detectors, such that each of the detection signals corresponds to light received from a respective one of the lasers.

The lasers 18 of FIG. 1 are semiconductor diode lasers that are operable to produce light over a sub-range of wavelengths. The lasers may be quantum cascade lasers, for example pulsed, chirped quantum cascade lasers, although any other suitable types of laser may be used in alternative embodiments. For example, interband cascade lasers and tuneable diode lasers may be used. The lasers may, for example, produce beams of 2 to 3 mm in diameter, or of any other suitable size.

The sub-ranges of wavelengths may be in the infra-red spectrum. The wavelength ranges are chosen to correspond to the measurement of one or more compounds. Together the instrument may provide multiple wavelength ranges of light and combines, for example, visible, near infrared and/or mid infrared light to take advantage of the most suitable wavelengths for each compound. The laser spectroscopy system is configured to measure impurities found in atmospheric air. Impurities that can be found in normal air include, but are not limited to methane, water and carbon dioxide.

Table 2 shows a first example implementation of wavelength ranges for lasers 18, the corresponding wavenumber range and the corresponding compound detected by light in this wavelength range. The configuration of lasers of FIG. 1 is suitable for measuring ethylene purity. For the first example, only one type of detector is required (corresponding to detector type A of Table 1) and no dichroic mirror is required.

TABLE 2

| Laser | Wavelength Range | Wavenumber Range/ cm−1 | Compounds Detected |
|---|---|---|---|
| 1 | 6.11-6.12 | 1635-1636 | Water (H2O) |
| 2 | 7.42-7.44 | 1345-1346 | Methanol (MeOH) |
| 3 | 6.14-6.16 | 1626-1627 | Ammonia (NH3) |
| 4 | 7.41-7.43 | 1347-1348 | Acetylene (C2H2) |
| 5 | 4.23-4.24 | 2362-2364 | Carbon Dioxide (CO2) |
| 6 | 4.73-4.74 | 2111-2112 | Carbon Monoxide (CO) |

Table 3 shows an alternative example implementation of wavelength ranges for lasers 18, the corresponding wavenumber range and the corresponding compound detected by light in this wavelength range. The laser wavelengths shown in Table 2 are suitable for measuring $H_2/N_2$ purity.

To implement Table 2 requires modification to the embodiment shown in FIG. 3. In particular, there is no sixth laser 78 and corresponding dichroic mirror 56, or sixth window 90 and sixth lens 102.

TABLE 3

| Laser | Wavelength Range (μm) | Wavenumber Range (cm$^{-1}$) | Compounds Detected |
|---|---|---|---|
| 1 | 4.21-4.24 | 2360-2370 | Carbon Dioxide (CO2) |
| 2 | 4.56-4.59 | 2180-2190 | Carbon Monoxide (CO) |
|   | 4.72-4.76 | 2105-2115 | Carbon Monoxide (CO) (alternate) |
| 3 | 6.09-6.14 | 1630-1640 | Water (H2O) |
| 4 | 7.43-7.47 | 1340-1345 | Methane (CH4) |
| 5 | 10.00-10.11 | 990-1000 | Ammonia (NH3) |

The control module 30 is configured to send one or more electronic control signals to the lasers 18. In response to the electronic control signals, the lasers 18 produce the combined laser beam 106. The control signal acts to pulse the lasers 18 sequentially. In other words, the control signal acts to drive each of the lasers 18 in a sequence, such that over a sample time interval only light from one laser is provided to the optical components 26. Thus, although reference is made to a combined laser beam, at any one point in time and position along the laser beam path, the combined laser beam at that position and point of time may consist of light from only one of the lasers. The combined laser beam may consist of interleaved, non-overlapping pulses from the different lasers. The optical components 26 are configured to direct the light from each laser along the optical path of the laser to follow the common path to the optical cell 10. In this way, the control module 30 controls the laser apparatus 12 to produce the combined laser beam 106 and provide the combined laser beam 106 to the optical cell 10. The combined laser beam 106 comprises pulsed beams from each of the lasers interleaved and/or non-overlapping in time.

The switching frequency between the lasers is selected to ensure a reliable measurement in the detector apparatus 17. In particular, the time taken for a pulse of light to traverse its optical cell optical path is dependent on the physical properties of the pulse and the dimensions of the optical cell 10. Pulse lengths and frequency of subsequent pulses are controlled and selected to prevent physical overlapping of pulses. Overlapping of pulses leads to interference and unreliable measurements. Two or more pulses can be present in a multi-pass cell at the same time provided that the two or more pulses are not physically overlapping. Suitable pulse durations for pulses from the lasers 18 may be between 100 nanoseconds and 20,000 nanoseconds. The frequency of sequential pulsing may be up to 100 kHz in some embodiments.

The signal processor 32 processes the detection signals from the detectors to determine the concentrations and/or relative amounts of the different compounds under investigation, or to determine any other desired properties. The signal processor 32 uses any suitable known processing techniques to determine the concentrations, relative amounts or other properties.

Optionally, an alignment mechanism may be provided. An example alignment mechanism comprises a camera and a mirror adjustment mechanism. The camera or is positioned at or near the point 104 to intersect a desired direction of propagation of the combined laser beam 106. The desired direction of propagation is such that the combined laser beam 106 will, in normal operation, enter the optical cell 10 via the common optical path. During an alignment step, sample beams are produced by the lasers 18 and the sample beams are directed by the optical components 26 to the camera. The camera detects the position of the sample beams incident on it relative to the desired direction of propagation. The mirror adjustment mechanism adjusts the position, in particular the tilt relative to the direction of propagation, of the partially reflective mirrors 54 and dichroic mirror 56 to substantially align the optical paths of the lasers 18 with the desired direction of propagation and substantially align the optical paths with each other. For example, the optical paths are substantially aligned within a 1.1° tolerance. The alignment step is repeated for each of the lasers 18.

Figure 5:
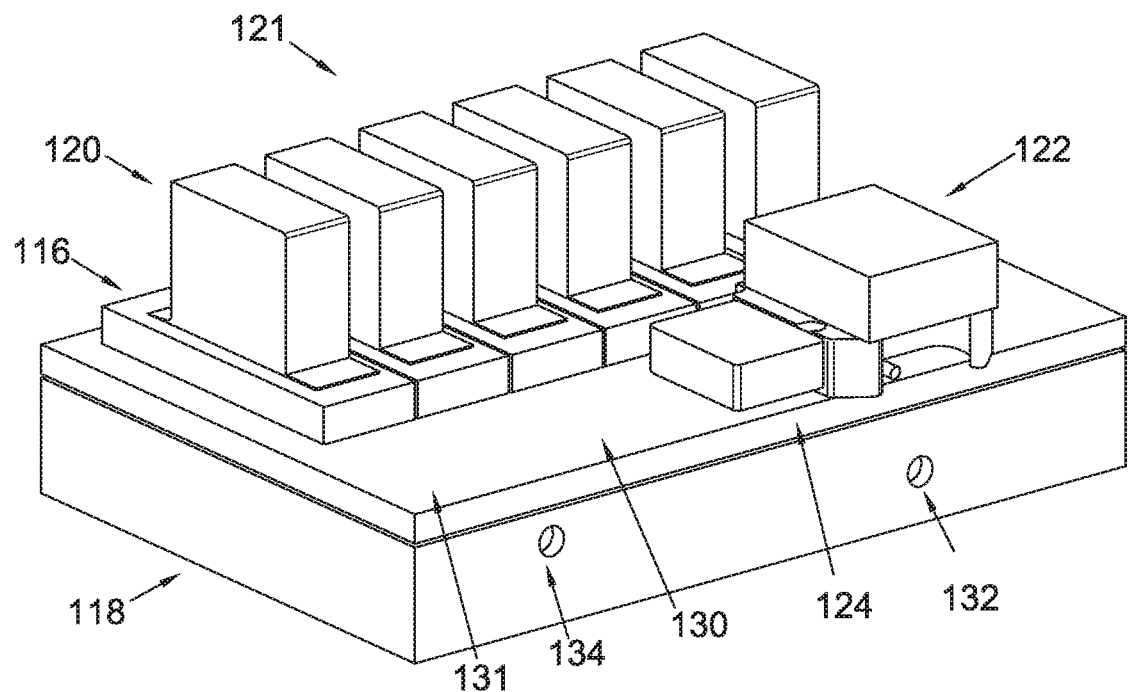
FIG. 5 is a perspective view of the laser spectroscopy system.

FIG. 5 is a perspective view of internal casing for the laser spectroscopy system. The casing has an upper optical plate 116 and a lower base section 118. The upper optical plate 116 is sized and dimensioned to receive the laser apparatus, here shown including six laser modules 121, including a laser module 120. The upper optical plate 116 also has a first detector 122, a second detector 124, a pressure gauge 126 and a temperature gauge 128. Also located on the upper optical plate 116 is a calibration mechanism 130. The calibration mechanism 130 can comprise an etalon for laser calibration. In addition, a removable mirror 131 may be added for optional attenuation of the laser beam. The lower base section 118 contains the sample chamber 24. The optical cell 10 is attached to a lower surface of the optical plate 116. The lower base section 118 is configured to be coupled with a gas supply arrangement via a gas inlet 132 and a gas outlet 134. Aside from the gas inlet 132 and gas outlet 134, the lower base section 118 is sealed.

Figure 6:
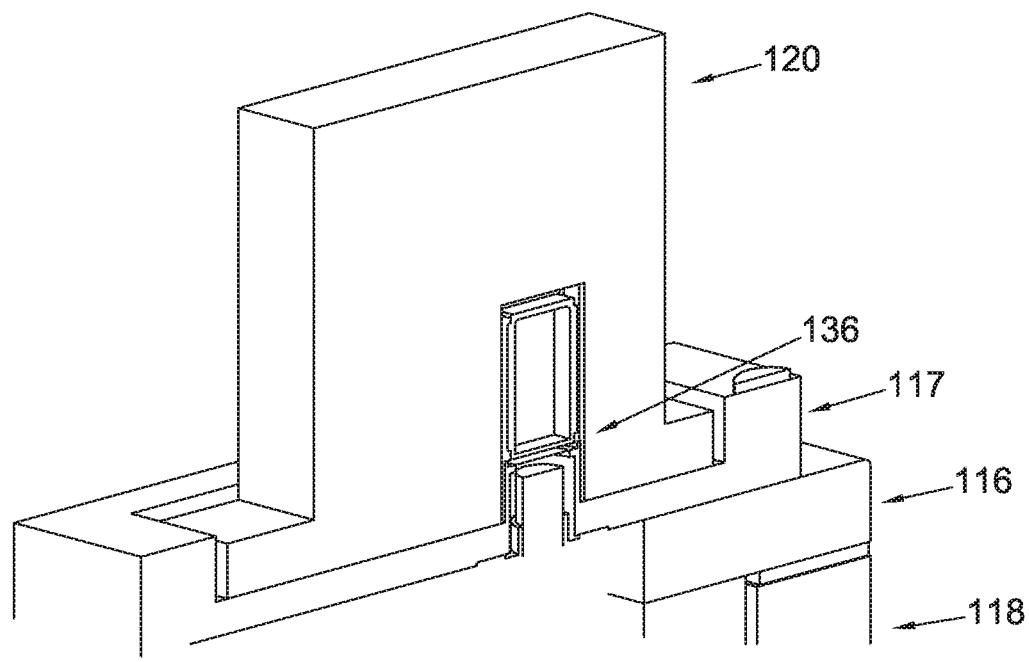
FIGS. 6 and 7 show a cross-sectional perspective view of an optical interface.

FIG. 6 is a cross-sectional perspective view of an example optical interface between a laser and a sample chamber. FIG. 6 shows the laser module 120 fitted to an interface plate 117 of the laser spectroscopy system. FIG. 6 also shows the upper optical plate 116 and the lower base section 118 in which the sample chamber is located. An optical interface 136 between the laser module 120 and the sample chamber of the lower base section 118 is indicated.

Figure 7:
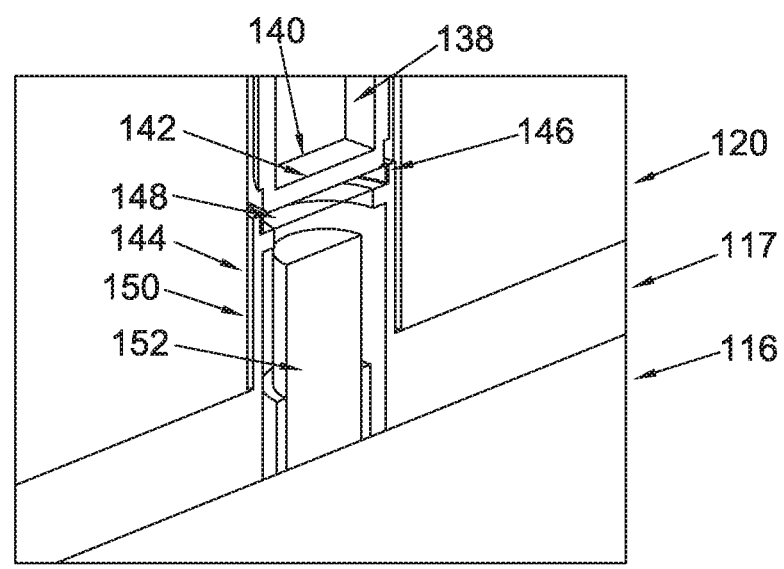

FIG. 7 is a zoomed view of FIG. 6 that shows a closer view of the optical interface 136. A laser package 138 of the laser module 120 is shown. The laser package 138 has a lower surface 140. The lower surface 140 is flat. At a central point of the lower surface 140 there is an aperture 142 for laser light to exit the laser module 120. The aperture 142 houses a window that serves to hermetically seal the laser package.

The interface plate 117 is configured to accommodate the laser module 120 to the spectroscopy system. In the embodiment of FIGS. 6 and 7, the interface plate 117 has a coupling member 144 for the corresponding laser module 120. The coupling member 144 is a hollowed cylindrical protrusion extended from the upper surface of the interface plate 117. At the upper end of the coupling member 144 is a rimmed circular seating 146. FIGS. 6 and 7 show a circular window 148 fixed in the rimmed circular seating 146. The circular window 148 and rimmed circular seating 146 are dimensioned such that, with the window 148 positioned in the rimmed circular seating 146, the upper surface of the coupling member 144 presents a flat and horizontal surface to the laser module 120.

The laser module 120 has a cavity 150 dimensioned to complement and conform to the shape of the coupling member 144 of the interface plate 117. The cavity is positioned directly below the lower surface 140 of the laser package 138. To fit the laser module 120 to the interface plate 117, the cavity 150 of the laser module 120 is placed over the coupling member 144 and thereby mounted on the coupling member 144. The size of the cavity 150 is such that, when mounted, the lower surface 140 of the laser package 138 is flush with the upper surface of coupling member 144. In this way, the laser module 120 is in contact and/or butt coupled to the window 148 of the coupling member 144. At least partially located in the hollow of the coupling member is a collimating lens 152. The collimating lens 152 is held in position by a lens holder 154 connected to and hanging from a lower inner surface of the interface plate 117. The collimating lens 152 acts to collimate the laser beam incident on it.

Figure 8:
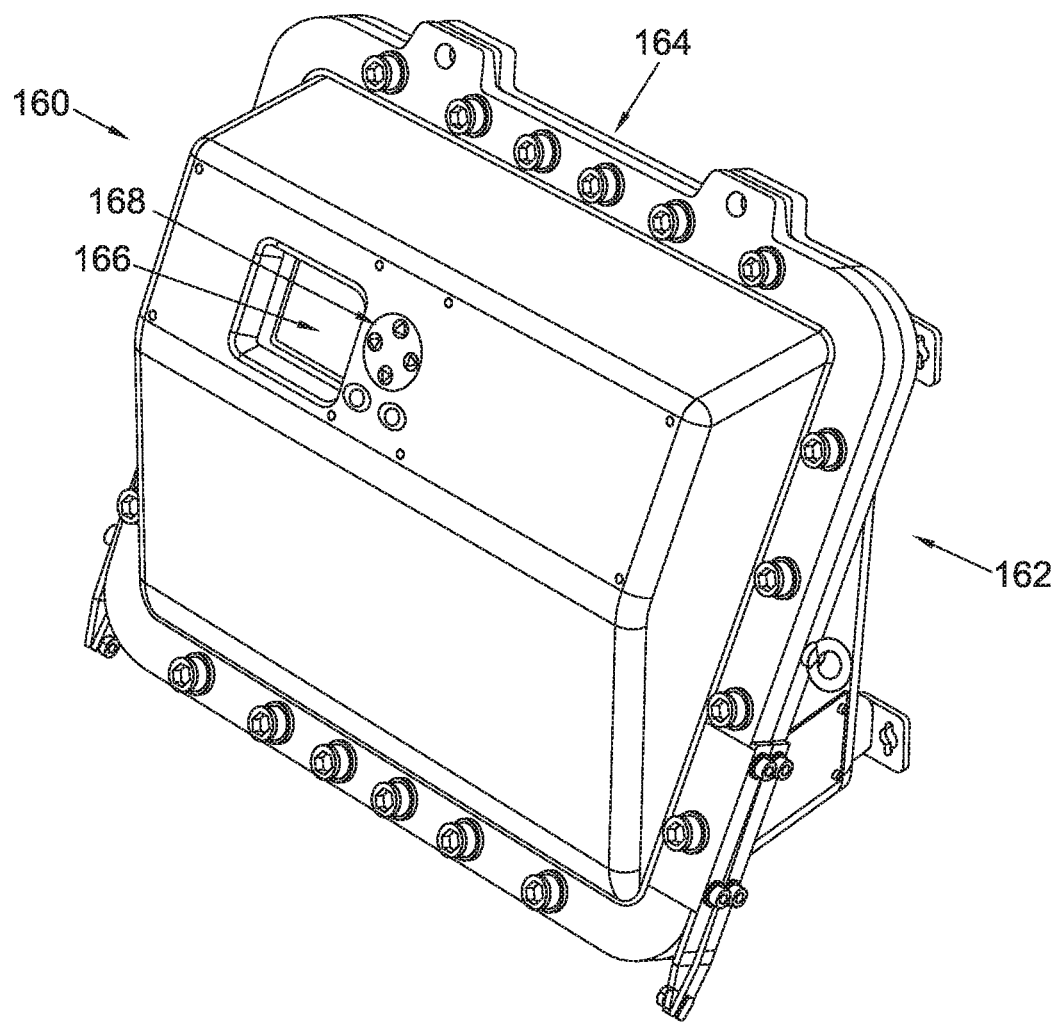
FIG. 8 is a perspective view of housing for the laser spectroscopy system in a closed configuration.

FIG. 8 is a perspective view of housing for the laser spectroscopy system in a closed configuration. The housing has a lift-off cover 160 that is secured in a closed position to a base section 162 by collection of release catches 164 located about the periphery of the housing A gas supply arrangement in the form of sample supply tube provides gas to the sample chamber, for example, via a gas inlet. A sample return tube provides an outlet for gas from the sample chamber, for example, via a gas outlet. Ventilation is provided to the optical cell via a vent. The lift off cover 160 has a local operator display 166 and user input pad 168. In the embodiment of FIG. 8 the user display and user input pad is for interaction with the analyser and visual communication of measurements and status. Some maintenance functionality is provided by the user input display in this embodiment, however its purpose is mostly communication of measurement values and status.

The housing is manufactured to be capable of containing an ignition event. The housing includes flame arrestors. The housing is tested to ensure that it can withstand a sudden high pressure event, for example, an explosion. This housing may obviate the need for additional purge apparatus.

Also connected to the housing are three output conduits (not shown). The conduits provide electrical breakthroughs that allow power and control signals to be sent to the system and to allow data to be transmitted from the system. The data transmitted may, for example, be in the form of digital signals, digital health signals, analogue signals for example 4-20 mA signals indicating measured values of gases, more sophisticated protocols such as Modbus, or in any other suitable format. The arrangement described above provides a compact system. In some embodiments, the housing may have dimensions of 600 mm by 490 mm by 274 mm.

The sample supply tube and the sample return tube provides a fluid to the communication path through the sample chamber and the optical cell. The sample gas can be collected from a remote location and can be delivered via the sample supply tube to the sample chamber to be sampled. The sample gas can then be exhausted from the sample chamber via the sample return tube. Together, the sample supply tube and the sample return tube allow for the instrument to operate remotely, in contrast to in-situ emission sensing. Any other suitable gas supply arrangement may be used in alternative embodiments.

A sample handling system (SHS) unit (not shown) may be provided to control pressure of the gas in the optical cell 10. Any suitable SHS unit or other pressure control device may be used, which may or may not comprise or be driven by a pump and may or may not comprise other pressure control components such as an arrangement of valves. In the embodiment of FIG. 8, the SHS unit includes an aspirator rather than a pump, although a pump or other pressure control device or components may be used in other embodiments.

Any suitable optical cell may be used as optical cell 10. For example, a Herriott cell is used as the optical cell. Any suitable Herriott cell may be used, or any suitable multipass spectroscopic absorption cell, or for example any other cell which is configured to provide interaction between the laser beam(s) and the sample gas, for instance by way of reflection of the laser beam between surfaces of a chamber containing the gas. For example, the optical cell may be an astigmatic Herriott cell.

In various embodiments, the sample chamber may be sealed and/or the system may comprise means for controlling the pressure and/or gaseous content of the sample chamber. Similarly, each laser may comprise a housing and at least one of: each laser housing may be sealed and/or is under vacuum or contains a selected gas and/or is at a selected pressure. In various embodiments, the detector apparatus comprises a housing and at least one of: the detector apparatus housing is sealed and/or is under vacuum or contains a selected gas and/or is at a selected pressure.

A skilled person will appreciate that variations of the described embodiments are possible without departing from the scope of the claimed invention. For example, while it is discussed that a control module in the controller is used to sequentially pulse the output of the lasers allowing the combined beam to be produced, other controller arrangements can also be used. One alternative is a mechanical optical switching arrangement that physically controls laser light such that only one laser provides light to the optical components over a given interval of time. As another example, the lasers described are semiconductor diode lasers that operate over a wavelength range. However, the lasers may be any suitable radiation source capable of providing suitable wavelengths of light. Additionally, the lasers may be single wavelength. Another example, of a modification is to replace the off-axis parabolic mirrors with any suitable focussing arrangement. Additionally, while the first optical interface may be a direct coupling in the sense of in contact and/or butt coupled, the second optical interface may be direct coupling in the sense of a separation of less than 1 mm. Additionally, the sample chamber may be such as to not include an optical cell comprising two mirrors to define a multi-pass arrangement. For example, the optical cell may comprise one mirror or no mirrors, and the sample chamber may provide a single pass arrangement and/or may not include a sample cell. Accordingly, the above description of the specific embodiments is made by way of example only and not for the purposes of limitations. It will be clear to the skilled person that minor modifications may be made without significant changes to the operations described.

The invention claimed is:

1. A laser detection system comprising:
 a sample chamber comprising an enclosed volume for receiving and containing a volume of sample gas;
 one or more laser modules, wherein each laser module comprises:
 a laser housed in a laser housing comprising an output aperture, wherein the laser is configured to produce a respective laser beam for excitation of one or more different materials in the sample gas and to output the laser beam via the output aperture, and wherein the one or more laser modules are outside the sample chamber;
 a detector apparatus for detecting light output from the sample chamber;
 an optical interface between the sample chamber and the one or more laser modules, having at least one optical window, and wherein the at least one optical window of the optical interface is at least partially transparent to the laser beams output from the one or more laser modules; and
 a coupling mechanism configured to position each laser module of the one or more laser modules in a close-coupling arrangement relative to the at least one optical window of the optical interface such that, in use, the laser beams are unmodified by passage between the output aperture of the laser housing of the laser module and the at least one optical window of the optical interface,
 wherein the coupling mechanism comprises a coupling member comprising:
 a protrusion extending from a surface of the sample chamber; and
 a corresponding cavity forming part of the one or more laser modules and configured to receive the protrusion to thereby position and hold the one or more laser modules in the close-coupling arrangement, wherein the coupling member comprises a rimmed seating at an end of the protrusion, wherein the at least one optical window of the optical interface is fixed in the rimmed seating, and wherein the at least one optical window of the optical interface and the rimmed seating are dimensioned such that the at least one optical window of the optical interface fixed in the rimmed seating and the rimmed seating form a flat surface at the end of the protrusion,
 wherein the protrusion is hollow,
 wherein the system further comprises a collimating lens provided inside the protrusion, and
 wherein the collimating lens is positioned in the protrusion such that at least part of the collimating lens is provided inside the corresponding cavity when in the close-coupling arrangement.

2. A system as claimed in claim 1, further comprising a second optical interface having at least one window that is at least partially transparent to light output from the sample chamber, wherein the detector apparatus is arranged to be in a second close-coupling arrangement with the second interface such that, in use, the laser beams are substantially unmodified by passage from the at least one window of the second optical interface to the detector apparatus.

3. A system as claimed in claim 1, wherein the close coupling arrangement is such that there is a separation of less than 10 mm or less than 5 mm or less than 1 mm between the output aperture of the laser housing and the at least one optical window of the optical interface.

4. A system as claimed in claim 2, wherein at least one of:
 the output aperture of the laser housing comprises at least one window through which the laser beams pass in operation, and the at least one window of the laser housing is in direct contact with the at least one optical window of the optical interface;
 the at least one optical window of the second optical interface is in direct contact with the detector apparatus.

5. A system as claimed in claim 1, wherein the at least one optical window of the optical interface comprises one or more flat or wedged optical windows, wherein each flat or wedged optical window is associated with a respective at least one of the lasers.

6. A system as claimed in claim 5, further comprising at least one directing device inside the sample chamber configured to direct laser beams passing through the at least one optical window of the optical interface to an optical cell in the sample chamber, wherein the at least one mirror device is configured to direct the laser beams along a common optical path to the optical cell.

7. A system as claimed in claim 6, wherein the at least one mirror device inside the sample chamber comprises a plurality of mirror components arranged such that, for each laser beam a respective at least one of the mirror components is arranged to direct said laser beam along the common optical path.

8. A system as claimed in claim 7, wherein at least one of:
 the plurality of mirror components are arranged substantially in a straight line; and
 at least one of the plurality of mirror components comprises a flat or non-wedged mirror component.

9. A system as claimed in claim 8, wherein the at least one optical windows of the optical interface and/or the plurality of mirror components has a thickness in a range from 0.1 mm to 1 mm.

10. A system as claimed in claim 1, further comprising:
 a controller configured to control operation of the one or more lasers modules such that the laser beams are pulsed laser beams interleaved in time.

11. A system as claimed in claim 1, wherein the sample gas comprises at least one of ethylene, $H_2$, $N_2$, or natural gas.

12. A system as claimed in claim 1, wherein the one or more different materials comprise at least one of: $CO_2$, CO, $H_2O$, $CH_4$ and $NH_3$.

13. A system as claimed in claim 1, wherein the one or more different materials comprise at least one of: $H_2O$, MeOH, $NH_3$, $C_2H_2$, $O_2$, HF, HCl, $H_2S$, CO and $CO_2$.

14. A system as claimed in claim 1, wherein each of the one or more laser modules comprises on laser module or a plurality of laser modules configured to produce laser beam of a respective different wavelength and/or the detector apparatus is configured to detect radiation of a respective different wavelength or range of wavelengths.

15. A system as claimed in claim 14, wherein at least one of the wavelengths or ranges of wavelengths is selected from the following ranges: 4.21 to 4.24 µm; 4.56 to 4.59 µm or 4.72 to 4.76 µm; 6.09 to 6.14 µm; 7.43 to 7.47 µm; and 10.00 to 10.11 µm.

16. A system according to claim 14, wherein at least one of the wavelengths or ranges of wavelengths is selected from the following ranges: 6.11 to 6.12 µm; 7.42 to 7.44 µm; 6.14 to 6.16 µm; 7.41 to 7.43 µm; 4.23 to 4.24 µm; and 4.73 and 4.74 µm.

17. A system according to claim 14, wherein at least one of the wavelengths or ranges of wavelengths is selected from the following ranges: 2.47 to 2.48 µm; 1.74 to 1.75 µm; 2.63 to 2.64 µm, 5.518 to 5.530 µm; and 4.854 to 4.878 µm.

18. A system according to claim 14, wherein at least one of the wavelengths or ranges of wavelengths is selected from the following range: 759 to 761 nm.

19. A system as claimed in claim 14, wherein the system is a continuous emission monitoring system or an $H_2$ purity measurement system or an $N_2$ purity measurement or a natural gas purity measurement system or an ethylene purity measurement system.

20. A system as claimed in claim 2, wherein at least one of:
for the close-coupling arrangement, there is a separation of less than 5 mm between the output aperture of the laser housing and the at least one optical window of the optical interface; and
for the second close-coupling arrangement, there is a separation of less than 5 mm between the at least one optical window of the second optical interface and the detector apparatus.

21. A system as claimed in claim 2, wherein at least one of:
for the close-coupling arrangement, there is a separation of less than 1 mm between the output aperture of the laser housing and the at least one optical window of the optical interface; and
for the second close-coupling arrangement, there is a separation of less than 1 mm between the at least one optical window of the second optical interface and the detector apparatus.

22. A system as claimed in claim 2, wherein the second close-coupling arrangement is such that there is a separation of less than 10 mm or less than 5 mm or less than 1mm between the at least one optical window of the second optical interface and the detector apparatus.

23. A system as claimed in claim 1, wherein the at least one optical window of the optical interface contacts a lower surface of the laser housing.

24. A system as claimed in claim 1, wherein the coupling member is part of an interface plate configured to accommodate a respective laser module.

25. A system as claimed in claim 1, wherein the corresponding cavity of the laser module housing is positioned directly below a lower surface of the laser module housing, and wherein the protrusion and the corresponding cavity are sized such that, when the corresponding cavity of the laser module is mounted on the coupling member and in the close-coupling arrangement, the lower surface of the laser housing is flush with the flat surface at the end of the protrusion.

26. A system as claimed in claim 1, wherein the corresponding cavity is dimensioned to complement and conform to the shape of the protrusion.

* * * * *